United States Patent [19]

Shook, Jr.

[11] 3,846,461
[45] Nov. 5, 1974

[54] PROCESS OF PREPARING A ZEROVALENT NICKEL COMPLEX WITH ORGANIC PHOSPHORUS COMPOUNDS

[75] Inventor: Howard E. Shook, Jr., Orange, Tex.

[73] Assignee: E. I. du Pont de Nemours and Company, Wilmington, Del.

[22] Filed: Oct. 25, 1972

[21] Appl. No.: 300,824

[52] U.S. Cl. ..... 260/439 R, 252/431 N, 252/431 P, 260/465.3
[51] Int. Cl. ............................................. C07f 15/04
[58] Field of Search ............. 260/439 R; 252/431 P

[56] References Cited
UNITED STATES PATENTS

| | | | |
|---|---|---|---|
| 3,346,608 | 10/1967 | Von Kutepow et al. | 260/439 R |
| 3,390,195 | 6/1968 | Chappell et al. | 260/439 R |
| 3,536,748 | 10/1970 | Drinkard et al. | 260/439 R |
| 3,538,142 | 11/1970 | Drinkard et al. | 260/439 R |
| 3,631,191 | 12/1971 | Kane et al. | 260/439 R |

Primary Examiner—Daniel E. Wyman
Assistant Examiner—A. P. Demers

[57] ABSTRACT

A zerovalent nickel complex is prepared by contacting nickel chloride with an organic nitrile, a triaryl phosphorus compound, a promoter of the group consisting of $NH_3$, $NH_4X$, $Zn(NH_3)_2X_2$ and mixtures of $NH_4X$ and $ZnX_2$, wherein X is halogen, the agent being present in an amount to provide a mole ratio of at least 0.01 based on the nickel, and a finely-divided reducing metal, and maintaining the reaction mixture at a temperature in the range of 60–115°C.

7 Claims, No Drawings

PROCESS OF PREPARING A ZEROVALENT NICKEL COMPLEX WITH ORGANIC PHOSPHORUS COMPOUNDS

BACKGROUND OF THE INVENTION

This invention is concerned with the preparation of zerovalent nickel complexes of triorganophosphites which are especially useful as catalysts in the hydrocyanation of olefins.

A number of methods have been described for the preparation of zerovalent complexes with organic phosphorus compounds. The preparation of such complexes by reaction of a nickel carbonyl with a triorganophosphite is found in U.S. Pat. No. 3,328,443. The preparation of similar complexes by reacting a triorganophosphite with an organonickel compound is described in U.S. pat. No. 3,152,158. A preparation involving the reduction of a nickel compound with a reducing metal in the presence of a triorganophosphite is described in Belgian Pat. No. 621,207; a similar preparation carried out in the added presence of 3-pentenenitrile is disclosed in application Ser. No. 729,882, filed May 18, 1968 by M. O. Unger and A. W. Anderson and now abandoned. Reduction of a divalent nickel compound in a saturated organic dinitrile solvent to produce the zerovalent complex substantially free of by-product, zinc chloride, is described in U.S. Pat. No. 3,631,191.

For large-scale manufacturing operations preparative methods more rapid than afforded by the methods described above are desired.

SUMMARY OF THE INVENTION

An improved method of preparing zerovalent nickel complexes of organic phosphorus compounds has now been found which involves contacting nickel chloride with an organic nitrile, a triaryl phosphite, a promotor of the group consisting of $NH_3$, $NH_4X$, $Zn(NH_3)_2X_2$ and mixtures of $NH_4X$ and $ZnX_2$ wherein X is chloride, bromide or iodide in amount to provide a mole ratio of at least 0.01 and preferably at least 0.05 based on the amount of nickel, and a finely-divided reducing metal which is more electropositive than nickel in the organic nitrile containing the triaryl phosphite. The reaction mixture is maintained at a temperature in the range of 60–115°C., preferably 75–110°C. with agitation for a time sufficient to produce the desired zerovalent nickel complex.

The zerovalent nickel complexes that can be produced by the method of this invention include those of the formula $NiL_4$ where l is a sigma pi bonding neutral ligand represented by $PZ_3$, wherein Z is OR and R is an aryl group having up to 18 carbon atoms. The Z groups may be the same or different and may be cojoined. Typical organic phosphorus compounds corresponding to $PZ_3$ include $P(OC_6H_5)_3$, $P(O—m—C_6H_4CH_3)_3$, $P(O—p—C_6H_{H4\ 3})_3$ and $P(O—m\ \&\ p—C_6H_4CH_3)_3$. Such $PZ_3$ ligands are particularly suited for the preparation of $NiL_4$ complexes. Nickel complexes of the type $NiL_4$ include $Ni[P(O—C_6H_5)_3]_4$, $Ni[P-(O—m—C_6H_4CH_3)_3]_4$, $Ni[P(O—p—C_6H_4CH_3)_3]_4$ and $Ni[P(O—m\ \&\ p—C_6H_4CH_3)_3]_4$.

Other zerovalent nickel complexes which can be produced by the method of this invention and which are useful in hydrocyanations as described in U.S. patent application Ser. No. 168,352, filed August 2, 1971 by C. M. King, W. C. Seidel and C. A. Tolman are those of the formulae $Ni(PZ_3)_3R^2$—CN and $Ni(PZ_3)_2A$ wherein Z is OR and R is an aryl radical having up to 18 carbon atoms and the groups aree so chosen that the ligand has a cone angle with an average value between 130°–170°, wherein A is an unsaturated organic nitrile containing up to 20 carbon atoms, having one olefinic carbon-carbon double bond and the carbon-carbon double bond is separated from the nitrile group by at least one carbon atom, wherein $R^2$ is of the class consisting of 2-butenyl, 3-butenyl and cyano substituted butyl radicals. The cone angle is measured as described by C. A. Tolman, *J. Am. Chem. Soc.* 92, 2956 (1970). Typical trivalent phosphorus ester ligands of this type include tri-o-tolylphosphite (cone angle 141°) and tri(2,5-xylyl)phosphite (cone angle 144°). Typical corresponding zerovalent nickel complexes include $Ni[P-(O—o—C_6H_4CH_3)_3]_3[NC—CH_2—CH=CH—CH_3]$, $Ni[P(O—o—C_6H_4CH_3)_3]_3$ $[NC(CH_2)_4CN]$ and $Ni[P-(O—o—C_6H_4CH_3)_3]_2[CH_3CH=CH—CH_2CH]$.

The organic nitriles employed in the preparative method of this invention can be mononitriles or dinitriles and include such nitriles such as 3-pentenenitrile, 4-pentenenitrile, adiponitrile, methylglutaronitrile and ethyl succinonitrile. Of these, 3-pentenenitrile and adiponitrile are preferred. Normally, at least about 5 moles of nitrile solvent per mole of nickel chloride is employed. Amounts up to 1000 moles or more based on nickel chloride can be used; generally amounts ranging from about 20 to about 100 moles are preferred.

Either nickel chloride or its hydrate can be used as the source of nickel. With respect to the promoters, the halides can be chloride, bromide or iodide. Agents which will generate ammonia such as ammonium carbamate or urea can also be used. Among the promoters, ammonia and the chlorides or bromides are preferred and more particularly ammonia and the promoters wherein halide is chloride. As noted above, an amount to give a mole ratio with respect to nickel of at least 0.05 is preferred; in general, no added advantage will be gained by using an amount greater than that corresponding to a mole ratio of about one with respect to the nickel.

For the preparation of zerovalent complexes the amount of the organic phosphorus compound should provide a molar ratio at least as great as the mole ratio of the ligand $PZ_3$ to nickel in the desired complex.

Operably reducing metals are those which are more electropositive than nickel in the organic nitrile containing the organic phosphite, that is, that have a greater tendency to give up electrons in this solvent system than does nickel. Useful metals include Na, Li, Mg, Ca, Ba, Sr, Ti, V, Fe, Co, Cu, Zn, Cd, Al, Ga, In, Sn, Pb and Th. The preferred reducing metal is zinc. The reducing metal should be in finely-divided form. That which will pass through a 50 mesh size screen is particularly suitable. In general, at least a stoichiometric amount of the reducing metal will be used, based on the amount of nickel to be reduced.

The reaction described above can be carried out at pressures in the range of 0.05 to 100 atomspheres; a range of 0.05 10 atmospheres, and more particularly, at atmospheric pressure is preferred. The time required to carry out the reactions will vary depending primarily on the temperature used. In general, the reaction can be completed in 2 to 3 hours. A particular advantage of this process is that it can be carried out at a relatively mild temperature, thus reducing the formation of undesired by-products. The zerovalent nickel complexes are particularly useful in the hydrocyanation of olefinic compounds.

DESCRIPTION OF PREFERRED EMBODIMENTS

The preferred embodiments of this invention are illustrated in the examples to follow. As indicated, the mole ratio of the promotor with respect to the nickel compound is preferably at least 0.05.

In the examples to be described below the reactions were carried out in an inert atmosphere such as nitrogen in a 300 ml. flask fitted with magnetic stirrer, condenser and thermometer. The apparatus was first purged with dry nitrogen and the reactants under a nitrogen blanket were charged to the flask and continued under nitrogen during reaction. The liquid reaction products were recovered from the flask under vacuum through a Buchner funnel attached to the bottom of the flask. The products were analyzed and conversion determined from analyses for elemental nickel and zerovalent nickel. Elemental analysis of nickel can be carried out by dissolving the sample in aqueous solvent after fusion with potassium pyrosulfate or by dissolving the sample directly in methanol and thereafter determining elemental nickel by atomic absorption spectroscopy. The zerovalent nickel can be determined as described by C. A. Tolman, *J. Am. Chem. Soc.* 92, 2956 (1970).

The use of $NH_3$ as a promoter in the preparation of zerovalent nickel complexes is summarized in Table I, use of $NH_4X$ in Table II, use of $Zn(NH_3)_2X_2$ in Table III and use of mixtures of $NH_4X$ and $ZnX_2$ in Table IV. Experiments 1, 2 and 9 of Table I, Experiments 1, 2 and 3 of Table II, Experiments 2, 5 and 7 of Table III and Experiment 1 of Table IV are illustrative of the prior art. Preparation of zerovalent nickel complexes having the formulae $Ni[P(O-o-C_6H_4CH_3)_3]_3[NC-CH_2-CH=CH-CH_3]$ and $Ni[P(O-o-C_6H_4CH_3)_3]_2C-H_3-CH=CH-CH_2CN]$ are represented in Experiments 9 and 10 of Table I and in Experiments 5 and 6 of Table III. The other experiments in the several tables represent the preparation of a zerovalent nickel complex of the formula $Ni[P(O-m$ and $p-C_6H_4CH_3)_3]_4$.

The following abbreviations are used in the tables:
m, p-TTP = mixed tri(meta and paratolyl)phosphites
o-TTP = Tri(orthotolyl)phosphite
3-PN = 3-penteneitrile

TABLE I

USE OF $NH_3$ AS PROMOTER

| Exp. | Nickel Chloride (g.) | Reducing Metal (g.) | Ligand (g.) | | Solvent (g.) | | Promoter (g.) | | Temp. (°C.) | Time (hr.) | Conversion (%) |
|---|---|---|---|---|---|---|---|---|---|---|---|
| 1 | 2.63 | Zn, 1.43 | m,p-TTP, | 60 | 3-PN, | 60 | — | | 100 | 1 | 6.2 |
| 2 | do. | do. do. | do. | do. | do. | do. | — | do. | 2 | 31.7 | |
| 3 | do. | do. do. | do. | do. | do. | do. | $NH_3$, | .015 | do. | 1 | 39.4 |
| 4 | do. | do. do. | do. | do. | do. | do. | do. | do. | do. | 2 | 60.3 |
| 5 | do. | do. do. | do. | do. | do. | do. | do. | 0.03 | do. | 1 | 51.9 |
| 6 | do. | do. do. | do. | do. | do. | do. | do. | 0.07 | do. | 1 | 85.1 |
| 7 | do. | do. do. | do. | do. | do. | do. | do. | 0.15 | d0. | 1 | 79.9 |
| 8 | do. | do. do. | do. | do. | do. | do. | do. | 0.22 | do. | 1 | 85.1 |
| 9 | do. | do. do. | o-TTP, | 32 | 3-PN, | 88 | — | — | 80 | 2 | 5.0 |
| 10 | do. | do. do. | do. | do. | do. | do. | do. | 0.22 | 80 | 2 | 55.5 |

TABLE II

USE OF $NH_4X$ AS PROMOTER

| Exp. | Nickel Chloride (g.) | Reducing Metal (g.) | Ligand (g.) | | Solvent (g.) | | Promoter (g.) | | Temp. (°C.) | Time (hr.) | Conversion (%) |
|---|---|---|---|---|---|---|---|---|---|---|---|
| 1 | 2.63 | Zn, 1.43 | m,p-TTP, | 60 | 3-PN, | 60 | — | | 100 | 1 | 6.2 |
| 2 | do. | do. do. | do. | do. | do. | do. | — | do. | 2 | 31.7 | |
| 3 | do. | do. do. | do. | do. | do. | do. | — | do. | 2.5 | 28.0 | |
| 4 | do. | do. do. | do. | do. | do. | do. | $NH_4Cl$, | .05 | do. | 1 | 17.7 |
| 5 | do. | do. do. | do. | do. | do. | do. | do. | do. | do. | 2.5 | 82.3 |
| 6 | do. | do. 1.57 | do. | do. | do. | do. | do. | do. | do. | 2.5 | 84.5 |
| 7 | do. | do. 1.43 | do. | do. | do. | do. | $NH_4Br$, | 0.1 | do. | 1 | 29.7 |
| 8 | do. | do. do. | do. | do. | do. | do. | do. | do. | do. | 2.5 | 84.2 |
| 9 | do. | do. do. | do. | do. | do. | do. | $NH_4Cl$, | 0.11 | do. | 1 | 15.1 |
| 10 | do. | do. do. | do. | do. | do. | do. | do. | do. | do. | 2 | 95.6 |
| 11 | do. | do. do. | do. | do. | do. | do. | $NH_4Br$, | 0.2 | do. | 1 | 38.5 |
| 12 | do. | do. do. | do. | do. | do. | do. | do. | do. | do. | 2 | 86.3 |
| 13 | do. | do. do. | do. | do. | do. | do. | $NH_4Cl$, | 0.53 | do. | 1 | 72.2 |
| 14 | do. | do. do. | do. | do. | do. | do. | do. | do. | do. | 2 | 95.4 |
| 15 | do. | do. do. | do. | do. | do. | do. | do. | do. | 110 | 1 | 86.0 |

TABLE III

USE OF $Zn(NH_3)_2X_2$ AS PROMOTER

| Exp. | Nickel Chloride (g.) | Reducing Metal (g.) | Ligand (g.) | | Solvent (g.) | | Promoter (g.) | | Temp. (°C.) | Time (hr.) | Conversion (%) |
|---|---|---|---|---|---|---|---|---|---|---|---|
| 1 | 2.63 | Zn, 1.43 | m,p-TTP | 60 | 3-PN, | 60 | $Zn(NH_3)_2Cl_2$, | 0.1 | 100 | 1 | 65.6 |
| 2 | do. | do. do. | do. | do. | do. | do. | — | | d0. | 1 | 6.2 |
| 3 | do. | do. do. | do. | do. | do. | do. | $Zn(NH_3)_2Cl_2$, | 0.2 | do. | 1 | 84.5 |
| 4 | do. | do. do. | do. | do. | do. | do. | do. | 0.3 | do. | 1 | 83.5 |
| 5 | do. | do. do. | o-TTP, | 32 | do. | 88 | — | | 80 | 2 | 5.0 |
| 6 | do. | do. do. | do. | do. | do. | do. | $Zn(NH_3)_2Cl_2$, | 0.5 | do. | 2 | 46.2 |
| 7 | do. | do. do. | m,p-TTP, | 32 | do. | do. | — | | 100 | 2 | 51.8 |
| 8 | do. | do. do. | do. | do. | do. | do. | $Zn(NH_3)_2Cl_2$, | 0.5 | do. | 2 | 96.7 |

TABLE IV

USE OF NH₄X/ZnX₂ MIXTURES AS PROMOTERS

| Exp. | Nickel Chloride (g.) | Reducing Metal (g.) | Ligand (g.) | | Solvent (g.) | | Promoter (g.) | | Temp. (°C.) | Time (hr.) | Conversion (%) |
|---|---|---|---|---|---|---|---|---|---|---|---|
| 1 | 2.63 | Zn, 1.43 | m,p-TTP, | 60 | 3-PN, | 60 | — | | 100 | 1 | 6.2 |
| 2 | do. | do. do. | do. | do. | do. | do. | ZnCl₂, | 0.27 | do. | 1 | 14.6 |
| 3 | do. | do. do. | do. | do. | do. | do. | NH₄Cl, | 0.11 | do. | 1 | 15.1 |
| 4 | do. | do. do. | do. | do. | do. | do. | ZnCl₂, +NH₄Cl, | 0.27 0.11 | do. | 1 | 61.6 |
| 5 | do. | do. do. | do. | do. | do. | do. | NH₄Br, | 0.2 | do. | 1 | 38.5 |
| 6 | do. | do. do. | do. | do. | do. | do. | ZnCl₂, +NH₄Br, | 0.27 0.2 | do. | 1 | 57.3 |

I claim:

1. A process of preparing a zerovalent complex of nickel with an organic phosphorus compound of the formula $PZ_3$ wherein Z is OR and R is a hydrocarbyl aryl radical having up to 18 carbon atoms which comprises contacting nickel chloride with an organic nitrile of the group consisting of 3-pentenenitrile, 4-pentenenitrile, adiponitrile, methylglutaronitrile and ethylsuccinonitrile, an organic phosphorus compound $PZ_3$, a promoter of the group consisting of $NH_3$, $NH_4X$, $Zn(NH_3)_2X_2$ and mixtures of $NH_4X$ and $ZnX_2$ wherein X is a halide of the group consisting of chloride, bromide and iodide in an amount to provide a mole ratio of promoter with respect to nickel of at least 0.01, and a finely-divided reducing metal which is more electropositive than nickel in the organic nitrile containing the organic phosphorus compound, and maintaining the reaction mixture at a temperature in the range of 60°C. to 115°C. to produce the zerovalent complex of the phosphorus compound $PZ_3$.

2. The process of claim 1 wherein the mole ratio of the promoter with respect to nickel is at least 0.05.

3. The process of claim 2 wherein the promoter is $NH_3$.

4. The process of claim 3 wherein the zerovalent complex of nickel has the formula $NiL_4$ wherein L is a sigma pi bonding neutral ligand represented by $PZ_3$ wherein Z is defined as in claim 1.

5. The process of claim 4 wherein R is mixed meta- and paratolyl.

6. A process of preparing a zerovalent complex of nickel with an organic phosphorus compound of the formula $PZ_3$ wherein Z is OR and R is a hydrocarbyl aryl radical having up to 18 carbon atoms, which comprises contacting nickel chloride with an organic nitrile of the group consisting of 3-pentene-nitrile, 4-pentenenitrile, adiponitrile, methyl glutaronitrile and ethyl succinonitrile, an organic phosphorus compound $PZ_3$ wherein R is chosen so that $PZ_3$ has a cone angle with an average value between 130° and 170°, a promoter of the group consisting of $NH_3$, $NH_4X$, $Zn(NH_3)_2X_2$ and mixtures of $NH_4X$ and $ZnX_2$ wherein X is a halide of the group consisting of chloride, bromide and iodide in an amount to provide a mole ratio of promoter with respect to nickel of at least 0.01, and a finely-divided reducing metal which is more electropositive than nickel in the organic nitrile containing the organic phosphorus compound and maintaining the reaction mixture at a temperature in the range of 60°C. to 115°C. to produce zerovalent nickel complexes of the formulae $Ni(PZ_3)_3R^2$—CN and $Ni(PZ_3)_2A$ wherein $R^2$ is of the class consisting of 2-butenyl, 3-butenyl and cyano substituted butyl radicals and A is selected from 3-pentenenitrile and 4-pentenenitrile.

7. The process of claim 6 wherein R is orthotolyl.

* * * * *